United States Patent

[11] 3,538,819

[72] Inventors John F. Gould, Jr.
North Little Rock, Arkansas;
William J. Petransky, Lansdowne, Pennsylvania
[21] Appl. No. 748,086
[22] Filed July 26, 1968
[45] Patented Nov. 10, 1970
[73] Assignee The United States of America as represented by the Secretary of the Navy

[54] AIRFIELD MATTING LOCKING PIN
3 Claims, 3 Drawing Figs.
[52] U.S. Cl. ........................................... 94/13, 52/579
[51] Int. Cl. ........................................ E01c 5/00
[50] Field of Search ............................ 52/579, 585, 122, 127; 94/13

[56] References Cited
UNITED STATES PATENTS
| | | | |
|---|---|---|---|
| 2,644,990 | 7/1953 | Smith | 52/588X |
| 2,826,970 | 3/1958 | Greulich | 94/13 |
| 2,942,535 | 6/1960 | Spangler | 94/13 |
| 3,301,147 | 1/1967 | Clayton | 94/13 |

Primary Examiner—Jacob L. Nackenoff
Attorneys—E. J. Brower and A. W. Collins

ABSTRACT: The present invention relates to a novel and improved assembly of matting elements that provide a suitable structural planar surface for aircraft takeoff and landing operations. The component mats or modules of the assembly are interconnected and interlocked to restrict relative movement therebetween by providing each mat with one or more locking pins that are disposed between upper and lower planar surfaces of each mat and slide between a nonlocking position where the pin is fully withdrawn in the mat and a locking position where the pin projects outwardly from its associated mat and engages an adjoining mat.

Patented Nov. 10, 1970
3,538,819
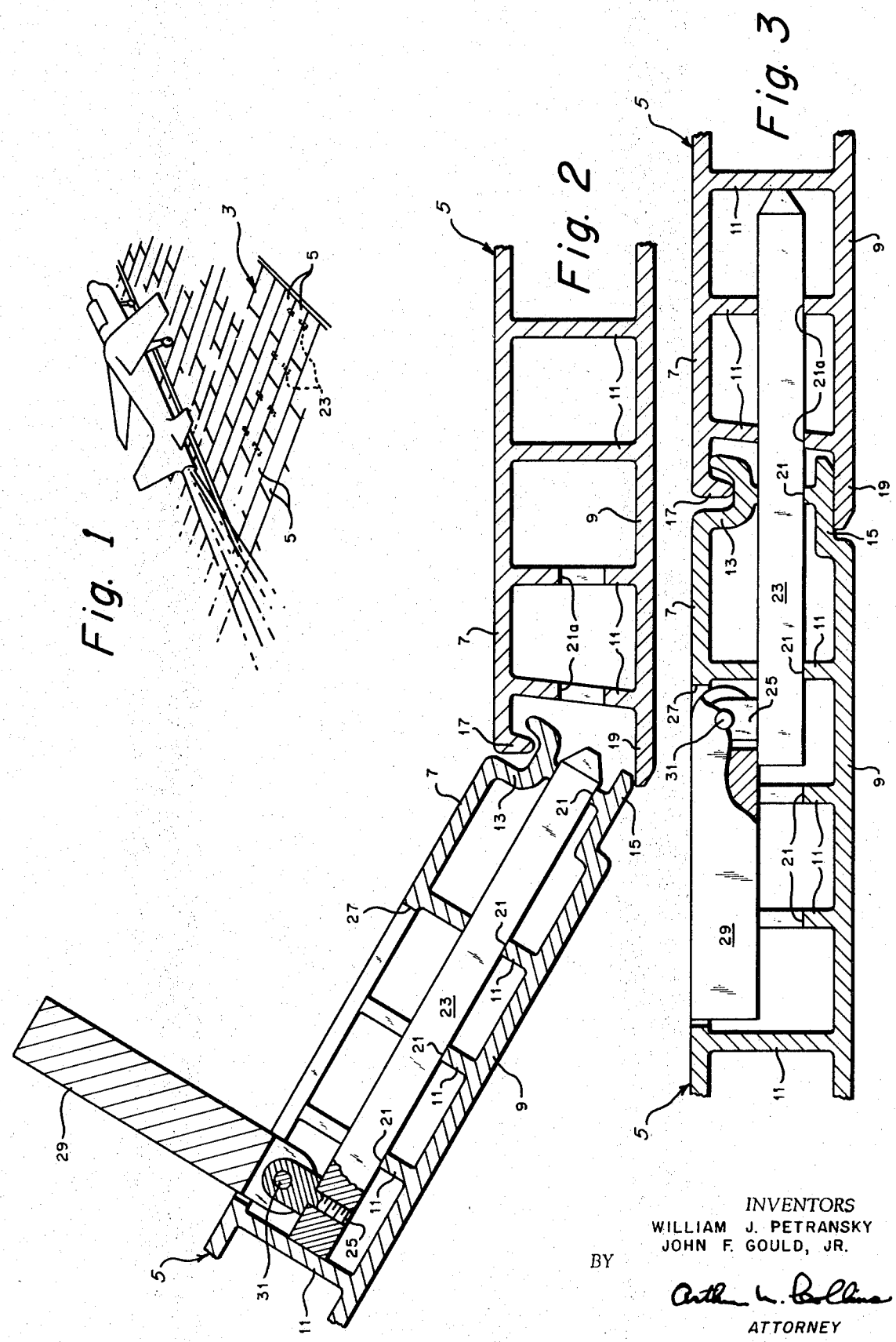
INVENTORS
WILLIAM J. PETRANSKY
JOHN F. GOULD, JR.
BY
Arthur L. Collins
ATTORNEY

AIRFIELD MATTING LOCKING PIN

Landing and takeoff surfaces for tactical aircraft must often be constructed under varying conditions on various types of supporting terrain in areas of varying size and shape. Airfields of this type often consist of a fabricated planar structure that is capable of ready assembly and disassembly with a minimum of effort. It must be sufficiently flexible to accommodate the uneven soil or terrain on which the airfield is to be constructed. It must continuously withstand intense jet blasts, impacts of heavy modern military aircraft and various other severe wear and tear conditions during aircraft takeoff and landing operations without deterioration, deformation or disjunction of its many component parts.

Various types of modular mat structures have been devised and used in the past to provide tactical airfields of this type. One particular modular mat structure, which has been found particularly useful for this purpose, employs a plurality of substantially identical extruded matting sections which include integrally extruded channelled and flanged side-edge portions that permit ready side-by-side interconnection of adjoining mats of the structural airfield surface. In matting assemblies of this kind, however, loads on the matting surface during aircraft takeoff and landing operations cause oscillatory hinging movement between individual interconnected mats of the assembly. This, in turn, causes subgrade cavitation and deterioration, as well as occasional mat connection failures.

It is therefore a principal object of the invention to provide a novel and improved modular mat structure, the component sections of which are connected one to the other in a practical and effective manner with a minimum of effort.

It is a further object of the invention to provide a novel and improved modular structural surface in which the component mats or modules thereof are positively interlocked one to the other so as to prevent an inadvertent interconnection failure and limit relative movement between modules.

Other objects and many of the attendant advantages of this invention will be readily appreciated as the same becomes better understood by reference to the following detailed description when considered in connection with the accompanying drawing wherein:

FIG. 1 is a perspective view of the improved modular airfield surface of the invention;

FIG. 2 is an enlarged cross-sectional view which shows how two adjoining mats of the airfield surface are preliminarily interconnected before the locking pin has been operated to its mat locking position;

FIG. 3 is a cross-sectional view of two interconnected mats of the airfield surface after the locking pin has been operated to its mat locking position.

Referring now to the various figures of the drawing, it will be noted that the improved aircraft landing and takeoff surface 3 of the invention consists of a plurality of similarly extruded mechanically interconnected mats or modules 5. Each mat or module 5 of the landing surface 3 includes upper and lower planar structural surfaces 7 and 9 which are interconnected and maintained in a predetermined parallel relationship by the plurality of interconnecting web elements 11. One lateral edge of the upper planar surface 7 of each mat 5 is extruded or otherwise suitably formed so as to provide an upwardly opening channel 13. The other lateral edge of the upper planar surface 7 of each mat is extruded or formed so as to provide a downwardly directed flange 17. The lateral edge of the lower planar surface 9 of each mat under the adjacent elongated channel 13 is extruded or formed so as to provide an inwardly recessed shoulder 15 and the other lateral edge of the lower planar surface 9 of each mat is extruded or formed so as to provide an extended projection 19. As will be more apparent hereinafter, these edge extrusions of the mats or modules 5 permit ready assembly of the mats into a continuous airfield surface by mechanically interconnecting the various component mats one to another.

In order to limit relative pivotal movement between interconnected mats, each mat or module 5 is further mechanically interconnected to adjoining mats or modules by a suitable locking mechanism. More specifically, apertures 21 in a predetermined number of web elements 11 at one end of each mat 5 accommodate a locking pin 23 that slides between a nonlocking position where the pin 23 is fully withdrawn between the upper and lower planar surfaces 7 and 9 of its associated mat and a locking position where the pin 23 projects outwardly from the end of its associated mat. Web elements 11 in the other end of each mat 5 are similarly apertured as at 21a to receive the outwardly projecting pin 23 when it occupies its locking position. Suitable design of the length of the locking pin 23 in each mat and the number of apertured web elements 11 permits the adjacent nonapertured web elements 11 to serve as stop members for the locking pin 23 in its full extended and retracted position.

The locking pin operating member 25 is threadedly or otherwise suitably secured to the locking pin 23 and extends upwardly through the elongated slot 27 in the upper planar surface 7 of the mat 5. The bifurcated end of the handle 29 is pivotably connected to the pin operating member 25 by means of the hinge pin 31. The handle is dimensioned so as to pivot downwardly flush with the upper planar surface of the mat and provide a continuous smooth aircraft landing and takeoff surface when the locking pin occupies either its full locked or unlocked position.

Although not shown in the drawing, it is to be understood that opposite ends of contiguous mats in the airfield surface may be similarly interconnected to limit relative movement therebetween without departing from the spirit or scope of the invention. To do so, it would merely require the use of additional web elements complementary to the web elements 11 shown in the drawing which are apertured to receive similar locking pins that slide between locking and nonlocking positions.

Assembly of the above described mats or modules 5 into a composite aircraft landing and takeoff surface is a relatively simple matter. The edge of each mat 5 having an upwardly opening channel 13 is tilted in the manner indicated in FIG. 2 of the drawing so as to engage and receive the downwardly directed flange 17 of the adjoining mat with which the tilted mat is to be connected. The tilted mat is then set down in its coplanar mechanically interconnected position with the other mat. Adjoining ends of adjacent mats are then interconnected one to the other in any suitable conventional manner. Each locking pin 23 is then operated to its mat locking position with the assistance of its associated handle 29. In this way, interaction between the apertured web elements of the mats and the peripheral surface of the locking pins limits relative pivotal movement of the various interconnected mats and minimizes subgrade deterioration and mat interconnection failures.

It is to be understood that although the assembly of mats disclosed herein is particularly useful in providing a suitable aircraft landing and takeoff surface, it could also be used for any other suitable purpose where a hard, durable, modular surface is required without departing from the spirit or scope of the invention.

Obviously, many modifications and variations of the present invention are possible in the light of the above teachings. It is therefore to be understood that within the scope of the appended claims, the invention may be practiced otherwise than as specifically described.

We claim:

1. An airfield surface comprising:

a. a plurality of substantially identical mats, each mat including upper and lower planar surfaces structurally interconnected and maintained in a substantially parallel relationship by a plurality of web elements;

b. means for securing the mats one to another to form an extended continuous planar surface; and c. means for limiting pivotal movement between adjoining mats including an elongated pin that slidably moves between locking and nonlocking positions in aligned openings through web elements of the mat structures, the upper planar surface of each mat including a slot that provides access to the elongated pin and permits control of its movement between its locking and nonlocking positions in the mat.

2. The apparatus substantially as claimed in claim 1 wherein a handle is pivotably connected to the pin to facilitate its movement between its locked and nonlocked positions.

3. The apparatus substantially as claimed in claim 2 wherein the handle when not in use can be positioned flush in the slot of the mat when the pin occupies its full locked or unlocked position.